(12) United States Patent
Yancy et al.

(10) Patent No.: US 7,644,289 B2
(45) Date of Patent: Jan. 5, 2010

(54) MODULAR CRYPTOGRAPHIC DEVICE PROVIDING ENHANCED COMMUNICATION CONTROL FEATURES AND RELATED METHODS

(75) Inventors: Bruce Wayne Yancy, Palm Bay, FL (US); Lawrence Richard Waldo, West Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 634 days.

(21) Appl. No.: 10/806,948

(22) Filed: Mar. 23, 2004

(65) Prior Publication Data
US 2005/0216734 A1   Sep. 29, 2005

(51) Int. Cl.
*H04L 9/00* (2006.01)
(52) U.S. Cl. .................. 713/192; 713/150; 713/153; 713/160; 713/162; 713/189
(58) Field of Classification Search ............. 713/192, 713/150, 153, 160, 162, 189, 190
See application file for complete search history.

(56) References Cited

U.S. PATENT DOCUMENTS

| | | | |
|---|---|---|---|
| 4,766,519 A | 8/1988 | Heiland | 361/399 |
| 4,907,275 A | 3/1990 | Hashimoto | 713/161 |
| 4,929,480 A | 5/1990 | Midkiff et al. | 428/35.6 |
| 5,524,134 A | 6/1996 | Gustafson et al. | 379/58 |
| 5,546,397 A | 8/1996 | Mahany | 370/85.1 |
| 5,757,924 A | 5/1998 | Friedman et al. | 380/49 |
| 5,778,071 A | 7/1998 | Caputo et al. | 380/25 |
| 5,786,789 A | 7/1998 | Janky | 342/357 |
| 5,805,416 A | 9/1998 | Friend et al. | 361/686 |
| 5,832,207 A | 11/1998 | Little et al. | 395/186 |
| 5,974,142 A | 10/1999 | Heer et al. | 380/9 |

(Continued)

FOREIGN PATENT DOCUMENTS

FR   EP089112   1/1999

(Continued)

OTHER PUBLICATIONS

"SecNet 54: Secure Wireless Local Area Network", Secure Communications Group 15/JWWG-Spring 2004 15, Harris Corporation [Online], Oct. 22, 2004, Dec. 24, 2004, pp. 1-15, XP002400216; YRL: http//www.govcomm.harris.com/secure-comm/secnet54/>.

(Continued)

*Primary Examiner*—Benjamin E Lanier
*Assistant Examiner*—Devin Almeida
(74) *Attorney, Agent, or Firm*—Allen, Dyer, Doppelt, Milbrath & Gilchrist, P.A. Attorneys at Law

(57) ABSTRACT

A cryptographic device may include a cryptographic module and a communications module coupled thereto. The cryptographic module may include a user network interface, a host network processor coupled to the user network interface, and a cryptographic processor coupled to the host network processor. Additionally, the communications module may include a network communications interface coupled to the cryptographic processor. The host processor may generate cryptographic processor command packets for the cryptographic processor each having an address portion and a data portion, and it may also encapsulate command packets for the communications module in the data portions of the cryptographic processor command packets. The cryptographic processor may pass the communications module command packets to the without performing cryptographic processing thereon.

41 Claims, 15 Drawing Sheets

U.S. PATENT DOCUMENTS

| | | | |
|---|---|---|---|
| 6,072,994 | A | 6/2000 | Phillips et al. ................. 455/84 |
| 6,108,425 | A | 8/2000 | Smith, Sr. et al. ........... 380/277 |
| 6,151,679 | A | 11/2000 | Friedman et al. ............ 713/201 |
| 6,212,280 | B1 | 4/2001 | Howard, Jr. et al. ......... 380/279 |
| 6,240,513 | B1 | 5/2001 | Friedman et al. ............ 713/152 |
| 6,242,691 | B1 | 6/2001 | Reese et al. ................ 174/35 R |
| 6,259,898 | B1 | 7/2001 | Lewis ......................... 455/103 |
| 6,393,261 | B1 | 5/2002 | Lewis ......................... 455/103 |
| 6,401,115 | B1 * | 6/2002 | Dichter ....................... 709/221 |
| 6,442,690 | B1 | 8/2002 | Howard, Jr. et al. ......... 713/175 |
| 6,700,787 | B1 | 3/2004 | Beseth et al. ................ 361/729 |
| 6,701,338 | B2 | 3/2004 | Narad et al. ................. 708/525 |
| 6,973,057 | B1 * | 12/2005 | Forslow ...................... 370/328 |
| 7,127,543 | B2 * | 10/2006 | Mitsuoka et al. ............ 710/305 |
| 2002/0094087 | A1 | 7/2002 | Dellmo et al. .............. 380/270 |
| 2002/0095594 | A1 | 7/2002 | Dellmo et al. .............. 713/200 |
| 2003/0221034 | A1 | 11/2003 | Cheng ........................ 710/301 |

FOREIGN PATENT DOCUMENTS

| | | |
|---|---|---|
| JP | 07-303139 A | 11/1995 |
| JP | 08-293856 A | 11/1996 |
| JP | 10-305016 | 11/1998 |
| JP | 11-127479 | 5/1999 |
| JP | 2002-091456 | 3/2002 |
| JP | 2003-174441 | 6/2003 |
| JP | 2003-319433 | 11/2003 |
| JP | 2003-331136 | 11/2003 |

OTHER PUBLICATIONS

"Media Independent Interface, Concepts and Guidelines", Wescon Conference Record, Nov. 7, 1995, pp. 348-353, XP000989659.

U.S. Robotics, 802.11g *Wireless Turbo Multi-Function Access Point*. Wireless LAN Access Point, IEEE 802.11b Compatible (Outdoor Bridge).

*Access Point, Bridge& Repeater with Integrated 15dB Antenna*, Gentek Marketing, 2002.

*Sierra II Programmable Cryptographic Module*, Harris Corporation, 2003.

Ying, *Key Hopping-A Security Enhancement Scheme for IEEE 802. 11 WEP Standards*, NextComm, Inc., Feb. 2002.

Taclane *Encryptor (KG-175)*, General Dynamics C4 Systems, 2004.

Johnson, Taclane's *Role in Information Assurance*, article available at www.chips.navy.mil/archives/02_summer/authors/index2_files/taclane.htm.

Stalings, William "Cryptography and Network Security Principles and Practices" 1999 Prentice-Hall.

Stevens, Richard "TCP/IP Illustrated, vol. 1 The Protocols" 1994 Addison Westley Longman.

* cited by examiner

MODULAR CRYPTOGRAPHIC DEVICE PROVIDING ENHANCED COMMUNICATION CONTROL FEATURES AND RELATED METHODS

FIELD OF THE INVENTION

The present invention relates to the field of communications networks, and, more particularly, to cryptography devices for use in communications networks and related methods.

BACKGROUND OF THE INVENTION

Security is an extremely important consideration in network communications. With the ever-increasing utilization of the Internet, most networks now have Internet gateways which open them up to external attacks by would-be hackers. Further, the popularity of wireless networks has also increased dramatically as technology has enabled faster and more reliable wireless communications. Yet, wireless communications are inherently less secure than wired communications, since wireless communication signals are typically much easier to intercept than signals on cables which are often difficult to access.

As a result, cryptography is often used to encrypt private or secret communications to reduce the likelihood that they will be deciphered and used by malicious individuals or organizations. By way of example, wireless local area networks (WLANs) and WLAN devices are widely used and provide a convenient and cost-effective approach for implementing network communications where it may be difficult or otherwise impractical to run cables. One of the more prominent standards which has been developed for regulating communications within WLANs is promulgated by the Institute of Electrical and Electronic Engineers' (IEEE) 802 LAN/MAN Standards Committee, which is the 802.11 standard. In addition to providing wireless communications protocols, the 802.11 standard also defines a wireless equivalent privacy (WEP) cryptographic algorithm which is used to protect wireless signals from eavesdropping.

WEP relies on a secret key that is shared between wireless stations and an access point. The secret key is used to encrypt data packets prior to transmission, and an integrity check is used to ensure that packages are not modified during the transmission. Nonetheless, it has recently been discovered that the WEP algorithm is not as immune to external attacks as once believed. For example, in an article entitled "Intercepting mobile communications: The Insecurity of 802.11" by Borisov et al., MOBICOM, Rome, Italy, July 2001, the authors set forth a number of vulnerabilities in WEP. In particular, it was noted that a significant breach of security occurs when two messages are encrypted using a same initialization vector (IV) and secret key, as this can reveal information about both messages.

Moreover, WEP message ciphertext is generated using an exclusive OR operation. By exclusive ORing ciphertext from two messages generated using the same IV, the key streams cancel out and it is then possible to recover the plain text. As such, this key stream re-use is susceptible to a decryption dictionary attack in which a number of messages are stored and compared to find multiple messages generated with a same IV.

As a result, more robust network security is often required for many network applications. One example of a network security device to be connected between a protected client and a network is disclosed in U.S. Pat. No. 6,240,513 to Friedman et al. The network security device negotiates a session key with any other protected client. Then, all communications between the two clients are encrypted. The device is self-configuring and locks itself to the IP address of its client. Thus, the client cannot change its IP address once set and therefore cannot emulate the IP address of another client. When a packet is transmitted from the protected host, the security device translates the MAC address of the client to its own MAC address before transmitting the packet into the network. Packets addressed to the host contain the MAC address of the security device. The security device translates its MAC address to the client's MAC address before transmitting the packet to the client.

Even more robust cryptographic devices may be required to secure sensitive or classified communications. More particularly, in the U.S. the communications of government entities that include sensitive (but unclassified) information must comply with the Federal Information Processing Standards Publication (FIPS) publication 140-2 entitled "Security Requirements For Cryptographic Modules." Classified communications, which are typically referred to as Type 1 communications, must comply with even stricter standards.

One example of an encryptor which is certified for Type 1 communications is the TACLANE Encryptor KG-175 from General Dynamics Corp. The "classic" version of the TACLANE encryptor has Internet Protocol (IP) and Asynchronous Transfer Mode (ATM) interfaces, and an E100 version has a fast Ethernet interface. The classic version may also be upgraded to fast Internet by replacing the IP/ATM network interface cards therein with two new E100 interface cards.

Despite the security benefits provided by such devices, many of these encryptors are fairly bulky and may consume significant amounts of power. One particularly advantageous cryptographic device which provides both space and power saving features is the Sierra module from Harris Corp., Assignee of the present application. The Sierra module is an embeddable encryption device that combines the advantages of high-grade security (e.g., Type 1) with the cost efficiency of a reprogrammable, commercially produced, FIPS 140-2 level 3 or 4 encryption module. The Sierra module can take on multiple encryption personalities depending on the particular application, providing encryption/decryption functionality, digital voice processing (vocoding) and cryptographic key management support functions. The Sierra module also provides the user with the capability to remove the Type 1 functionality, allowing the device to be downgraded to an unclassified device. Also, because of its relatively small size, low power and high data rates, this device is well-suited for battery sensitive applications.

By way of example, the Sierra module has been implemented in a Secure WLAN (SWLAN) personal computer (PC) card called SecNet 11, which is also produced by Harris Corp. The SecNet 11 card allows rapid communication of multimedia information (data, voice, and video) in a secure environment. The SecNet 11 card may be used as a wireless network interface card for WLAN "stations," for wireless bridges, and for access point (APs), for example. The SecNet 11 device is more fully described in U.S. published application nos. 2002/0094087 and 2002/0095594, both of which are hereby incorporated herein in their entireties by reference.

Accordingly, the SecNet 11 card provides numerous advantages in terms of size, power requirements, and flexibility in WLAN environments. However, it may be desirable to provide such benefits in other network environments as well.

SUMMARY OF THE INVENTION

In view of the foregoing background, it is therefore an object of the present invention to provide a cryptographic device that provides high level security and is relatively easily adaptable to numerous network environments and related methods.

This and other objects, features, and advantages in accordance with the present invention are provided by a cryptographic device which may include a cryptographic module and a communications module coupled thereto. More particularly, the cryptographic module may include a user network interface (e.g., a user Local Area Network (LAN) interface), a host network processor coupled to the user LAN interface, and a cryptographic processor coupled to the host network processor. Additionally, the communications module may include a network communications interface (e.g., a network LAN interface) coupled to the cryptographic processor. The host network processor may generate cryptographic processor command packets for the cryptographic processor each having an address portion and a data portion, and it may also encapsulate command packets for the communications module interface in the data portions of the cryptographic processor command packets. Moreover, the cryptographic processor may pass the command packets to the communications module without performing cryptographic processing thereon.

More particularly, the communications module may be a predetermined one from among a plurality of interchangeable communications modules each for communicating over a different communications media. Thus, the same cryptographic module may advantageously be used for numerous network applications simply be interchanging the appropriate communication module for the desired application. As such, a user advantageously need only one cryptographic module for a given network device, but can readily adapt the one cryptographic module for different networks by interchanging communications modules. In addition, since the host network processor advantageously encapsulates command packets for the communications module in cryptographic processor command packets, commands may relatively easily be passed to the communications module along the same path as encrypted data, yet without compromising device security.

By way of example, the host network processor may format the communications module command packets based upon the simple network management protocol (SNMP). The communications module command packets may be Ethernet packets, and the cryptographic processor command packets may be Internet protocol (IP) packets. In addition, the cryptographic module may further include a first housing carrying the user network interface, the host network processor, and the cryptography processor. More particularly, the cryptographic processor may include an unencrypted data buffer circuit coupled to the host network processor, a cryptography circuit coupled to the unencrypted data buffer circuit, and an encrypted data buffer circuit coupled to the cryptography circuit. A first connector may also be carried by the first housing and coupled to the cryptographic processor.

Moreover, the communications module may further include a second housing carrying the network communications interface, and a second connector carried by the second housing and being removably mateable with the first connector of the cryptographic module. The network communications interface may advantageously be a wireless LAN (WLAN) communication circuit, a wireline communication circuit, or a fiber optic communication circuit, for example. Also, the user network interface may be an Ethernet interface.

To provide still further security features, the cryptographic module may also include a tamper circuit for disabling the cryptographic processor based upon tampering with the first housing. By way of example, the tamper circuit may include one or more conductors substantially surrounding the cryptographic processor, and the cryptographic processor may be disabled based upon a break in the conductor(s).

A communications method aspect of the invention may include providing a cryptographic module, such as the one described briefly above, and having a communications module coupled thereto. More particularly, the communications module may include a network communications interface coupled to the cryptographic processor of the cryptographic module. The method may further include causing the host network processor to generate cryptographic processor command packets for the cryptographic processor each including an address portion and a data portion, and to encapsulate command packets for the communications module in the data portions of the cryptographic processor command packets. The method may also include causing the cryptographic processor to pass the communications module command packets to the communications module without performing cryptographic processing thereon.

A communications system in accordance with the invention may include a plurality of network devices coupled together to define a network, and a cryptographic device, such as the one described briefly above, coupled to at least one of the network devices.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements or steps in different embodiments.

Figure 1:
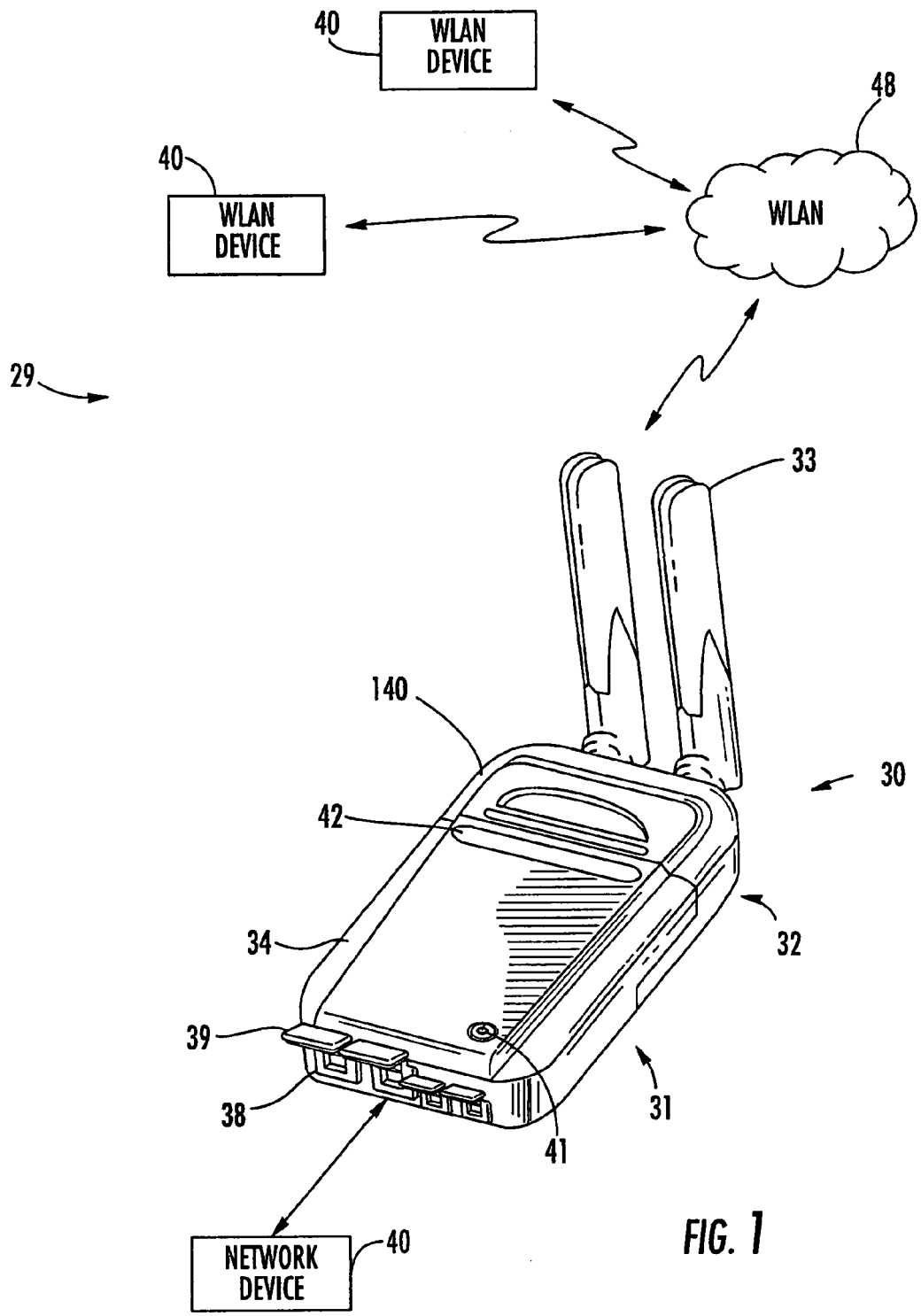
FIG. 1 is perspective view of a cryptographic device in accordance with the present invention.
Figure 2:
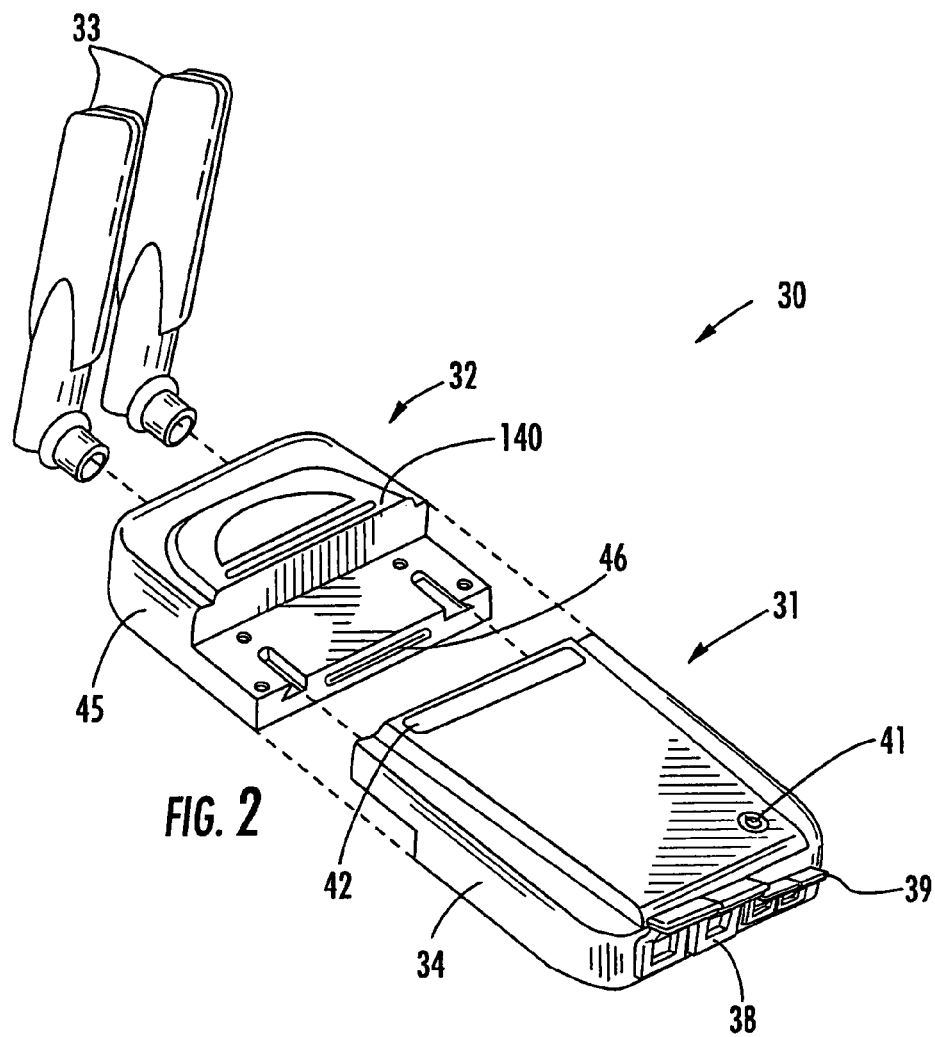
FIG. 2 is an exploded view of the cryptographic device of FIG. 1 illustrating the various modules thereof.
Figure 3:
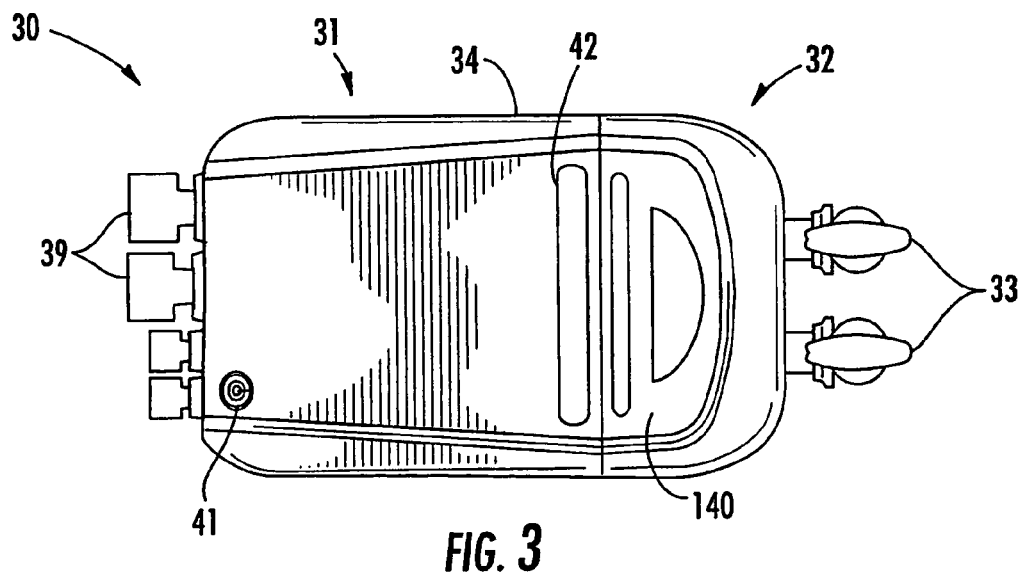
FIG. 3 is top plan view of the cryptographic device of FIG. 1.
Figure 4:
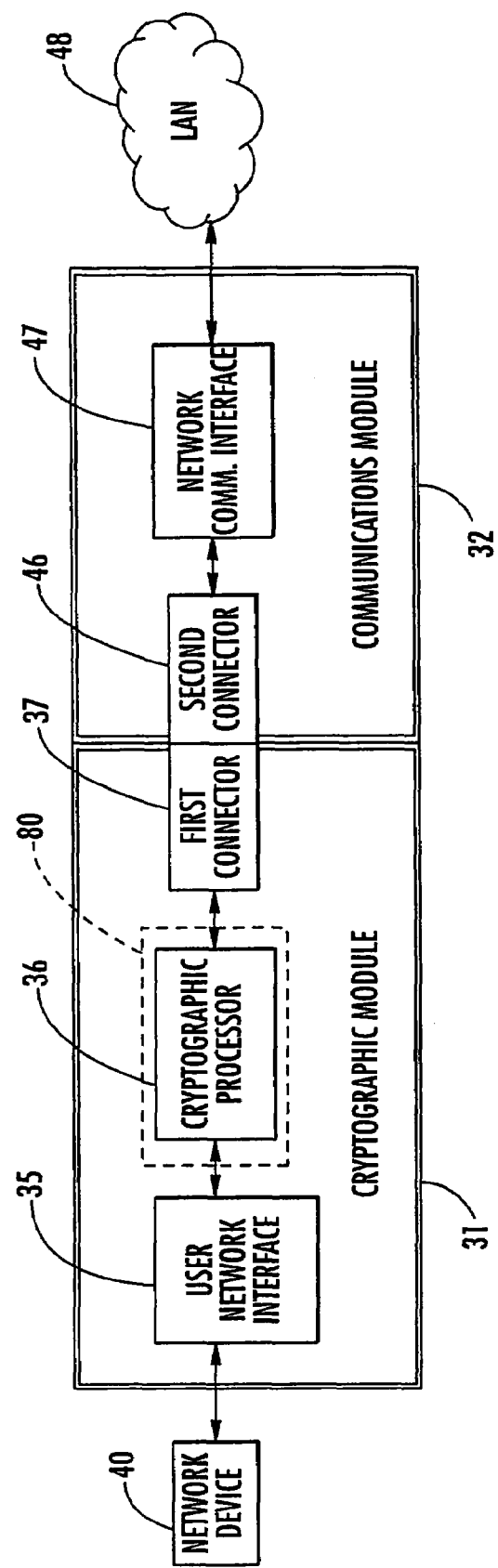
FIGS. 4 through 9 are schematic block diagrams illustrating the various components of the cryptographic device of FIG. 1 in greater detail.

Referring initially to FIGS. 1 through 9, a communication system 29 in accordance with the present invention illustratively includes a cryptographic device 30, a plurality of network devices 40, and a network such as a wireless Local Area Network (WLAN) 48. The cryptographic device 30 illustratively includes a cryptographic module 31 coupled to one of the devices 40 and a communications module 32. As shown in FIG. 2, the communications module 32 is removably coupled to the cryptographic module 31, as will be discussed further below. Generally speaking, in accordance with the present invention, a plurality of interchangeable communications modules 32 may be connected to the cryptographic module 31 for communicating over different communications media. While in the illustrated embodiment the communications module 32 is a WLAN module which includes dual tri-band antennas 33, it will be appreciated based upon the following discussion that the cryptographic device 30 can be used with numerous types of wired and wireless networks.

By including the appropriate chip sets/interface circuitry in different communications modules 32, each of these modules may interface with a different network medium (e.g., WLAN, wireline medium, fiber optic medium, etc.), yet all interface with the same cryptographic module 31. That is, the same cryptographic module 31 may be used for numerous network applications simply by coupling the appropriate communications module 32 thereto for the desired application. Examples of various types of communications modules 32 that may be used include WLAN modules, plain old telephone service (POTS) modules, tactical radio modules, E1/T1 modules, in-line network encryptor (INE) modules, a VersaModule Eurocard (VME) bus module, etc.

The modular design and ease of interchangeability not only provides a convenient way to quickly configure the cryptographic module 31 for different applications, but it may also be particularly useful for high level security applications such a Type 1, FIPS 140-2 level 4, etc. This is because the evaluation process to have a cryptographic device certified for use with sensitive or classified communications at these levels can be quite lengthy and extensive, and consequently costly. Thus, to manufacture respective cryptographic devices for different network applications can be cost prohibitive since each one will have to individually undergo the rigorous and costly certification.

Yet, since in accordance with the present invention the cryptographic module 31 preferably includes all of the sensitive cryptographic circuitry and associated cryptographic algorithms/keys, the various communications modules 32 merely provide interfaces for different types of networks. That is, they do not process or transmit "red" (i.e., unencrypted) confidential/classified data, and thus they will likely not require the same certification scrutiny as the cryptographic module 31. Accordingly, the communications modules 32 may provide significant cost savings over having to purchase an entirely new cryptographic device with a different network interface for each desired application.

In particular, the cryptographic module 31 illustratively includes a first housing 34, a user network interface 35 carried by the first housing, a cryptographic processor 36 carried by the first housing and coupled to the user network interface, and a first inter-module connector 37 carried by the first housing and coupled to the cryptographic processor. The user network interface 35 may be an Ethernet physical layer (PHY) interface compatible with the IEEE 802.3 standard, for example, as will be appreciated by those skilled in the art. Various connectors 38 are also carried by the first housing 34 for coupling the cryptographic module 31 to different network devices 40 (e.g., personal computers (PCs), servers, portable communications devices, etc.).

By way of example, the connectors 38 may be wireline connectors, such as an RJ45 connector 85 (FIG. 8), or fiber optic connectors, such as an LC fiber optic connector 86. Caps 39 may also be included for protecting the connectors 34. A power switch 41 and LED status indicators 42 (i.e., power, link state, fill, and alarm) are also carried by the first housing 34.

It should be noted that the term "user" is used with relation to the user network interface 35 simply to indicate that this interface is for the user network device side and not the communications network side of the cryptographic device 30. That is, "user" does not mean that the interface 35 is only for individual user devices such as PCs. Instead, the user network interface may be connected to a variety of different LAN devices (e.g., servers, bridges, access points, etc.), as noted above.

The communications module 32 illustratively includes a second housing 45, a second inter-module connector 46 carried by the second housing and removably mateable with the first connector 37 of the cryptographic module 31, and a network communications interface 47 carried by the second housing 45 and coupled to the second connector. In the present example, the network communications interface 47 includes a WLAN communication circuit (e.g., an 802.11 chip set) for cooperating with the antennas 33 to wirelessly communicate with a network (e.g., LAN) 48, as will be discussed further below. Yet, as noted above, the network communications interface 47 may be a wireline LAN communication circuit, a fiber optic LAN communication circuit, etc., for example.

The various circuit components of the cryptographic module 31 may be implemented in a cryptographic circuit card (CCA) 50, for example, as will be appreciated by those skilled in the art. The circuitry of the communications module 32 may similarly be implemented in a CCA 51. The cryptographic module 31 may also include a power CCA 52 carried by the first housing 34 and including power supply/filtering circuitry 53 for powering the cryptographic processor 36, the user network interface 35, and the communications module 32.

The cryptographic processor 36 may include a host network processor 54 connected to the user network interface 35, and cryptography circuitry 55 connected to the host network processor. More particularly, the cryptography circuitry 55 illustratively includes an unencrypted (i.e., "red") data buffer 56 connected to the host network processor 54, a cryptography circuit 57 connected to the unencrypted data buffer, and an encrypted (i.e., "black") data buffer 58 connected between the cryptography circuit and the first connector 37.

By way of example, the unencrypted and encrypted data buffers may be first-in, first-out (FIFO) buffers implemented using field-programmable gate arrays (FPGAs), and the cryptography circuit 57 may be implemented in an application specific integrated circuit (ASIC). One cryptography ASIC that is particularly well suited for use with the present invention is the above-noted Sierra (and Sierra II) device from Harris Corp. Of course, it will be appreciated by those skilled in the art that other suitable circuitry may be used as well.

The host network processor 54 illustratively includes a plurality of modules which may be implemented using hardware and/or software, as will be appreciated by those skilled in the art. Generally speaking, the host network processor 54 includes a first 802.3 medium access controller (MAC) controller 60 for interfacing the user network interface 35, a second 802.3 MAC controller 61 for interfacing the cryptographic processor 36 and network communications interface 47, as will be described further below, and a processor 62 coupled between the MAC controllers. The host network processor 54 and user network interface 35 may communicate via dedicated lines for Media Independent Interface (MII) communications, as will be discussed further below, and a management data input/output bus (FIGS. 6 and 8), for example.

More specifically, the processor 62 may include a hypertext transfer protocol (HTTP) server module 73, a simple network management protocol agent 63, a firewall/routing module 64, an over the air re-keying/over the network re-keying (OTAR/OTNR) module 65, and an over the air zeroization/over the network zeroization (OTAZ/OTNZ) module 66. Moreover, the processor 54 also illustratively includes a mode controller 67 for providing proper configuration based upon the particular mode or media with which the cryptographic module 31 is to operate (e.g., WLAN access point (AP) mode, ad-hoc mode, infrastructure mode, etc.). The mode controller 67 may also perform other configuration/monitoring functions, such as for service set identifiers (SSIDs), channel, transmission level, data rate, 802.11 band selection (i.e., a, b, g) depending upon the particular application the cryptographic module 31 is to be used for, as will be appreciated by those skilled in the art. Additional modules such as an Internet protocol (IP) security protocol (IPSec)/high-assurance IP encryption (HAIPE) module 68, a key management module 69, and/or a device discovery module 70 may also be included depending upon the given implementation, as will also be appreciated by those skilled in the art. The cryptographic module also preferably includes respective memory devices 71, 72 for the host network processor 54 and cryptography circuit 57.

The power circuitry 53 illustratively includes external power interface (I/F) circuitry 75, which may be connected to a DC source (e.g., battery), a wall wart AC adapter, an Ethernet power source, etc. Of course, it will be appreciated that other power sources may be used in different implementations. The power circuitry 53 further illustratively includes cryptographic/communications module power isolation/filtering circuitry 76 coupled to the external power I/F circuitry 75. A cryptographic module power circuit 77 and a communications module power circuit 78 are coupled to the power isolation/filtering circuitry 76 for respectively supplying the cryptographic and communications modules 31, 32. Further, a data filter/electrostatic discharge (ESD) protection circuit 79 is included for filtering signals communicated between the cryptographic module 31 and communications module 32, as will be appreciated by those skilled in the art.

To receive high level certification (e.g., level 4 FIPS 140-2, Type 1) for classified and/or secret communications, cryptographic devices typically have to include some degree of physical tamper protection to prevent malicious individuals or organizations from physically compromising the device and discovering the secret key or algorithm being used. In accordance with the present invention, the cryptographic module 31 also illustratively includes a tamper circuit 80 for disabling the cryptography circuit 57 based upon tampering with the first housing 34. By way of example, the tamper circuit 80 preferably includes one or more conductors substantially surrounding the cryptography circuit 57 so that the cryptographic processor is disabled based upon a break in any one of the conductors.

More particularly, the conductors may be relatively thin printed circuit traces printed on the inside of the first housing 34 and attached to the cryptographic processor 36. Since the conductors substantially surround the cryptographic processor 36 (or some portion thereof), if someone attempts to drill through the first housing 34 to access the cryptographic processor then one or more of the printed traces will be broken. The same holds true if someone opens the first housing, as the traces will be pulled away from the cryptographic processor 36 also causing breaks therein.

In either event, the open circuit condition resulting from the broken conductor(s) causes power to a cryptographic power interface circuit 81 to be disrupted to be discontinued. That is, power from a dedicated encryption algorithm/secret key battery 82 is prohibited from flowing to the cryptographic power interface circuit 81 via the cryptographic module power circuitry 77. As a result, the algorithm and secret key, which are preferably stored in a volatile memory, are permanently and instantly erased so that they cannot be discovered by malicious individuals or organizations. The tamper circuit 80 may thus provide tamper protection from all angles, if desired.

As noted above, the cryptography circuit 57 implements a desired encryption algorithm to provide a predetermined security level (e.g., Type 1, FIPS 140-2 levels 1 through 4, etc.). By way of example, Advanced Encryption Standard (AES), Baton, or Medley encryption algorithms may be used to provide such high level security. Of course, other high level security algorithms known to those skilled in the art may be used as well. Additionally, other cryptographic algorithms which are considered to be less secure than those noted above may also be used in accordance with the present invention when the cryptographic device 30 is to be used in less sensitive environments (e.g., general commercial or corporate applications).

Figure 8:
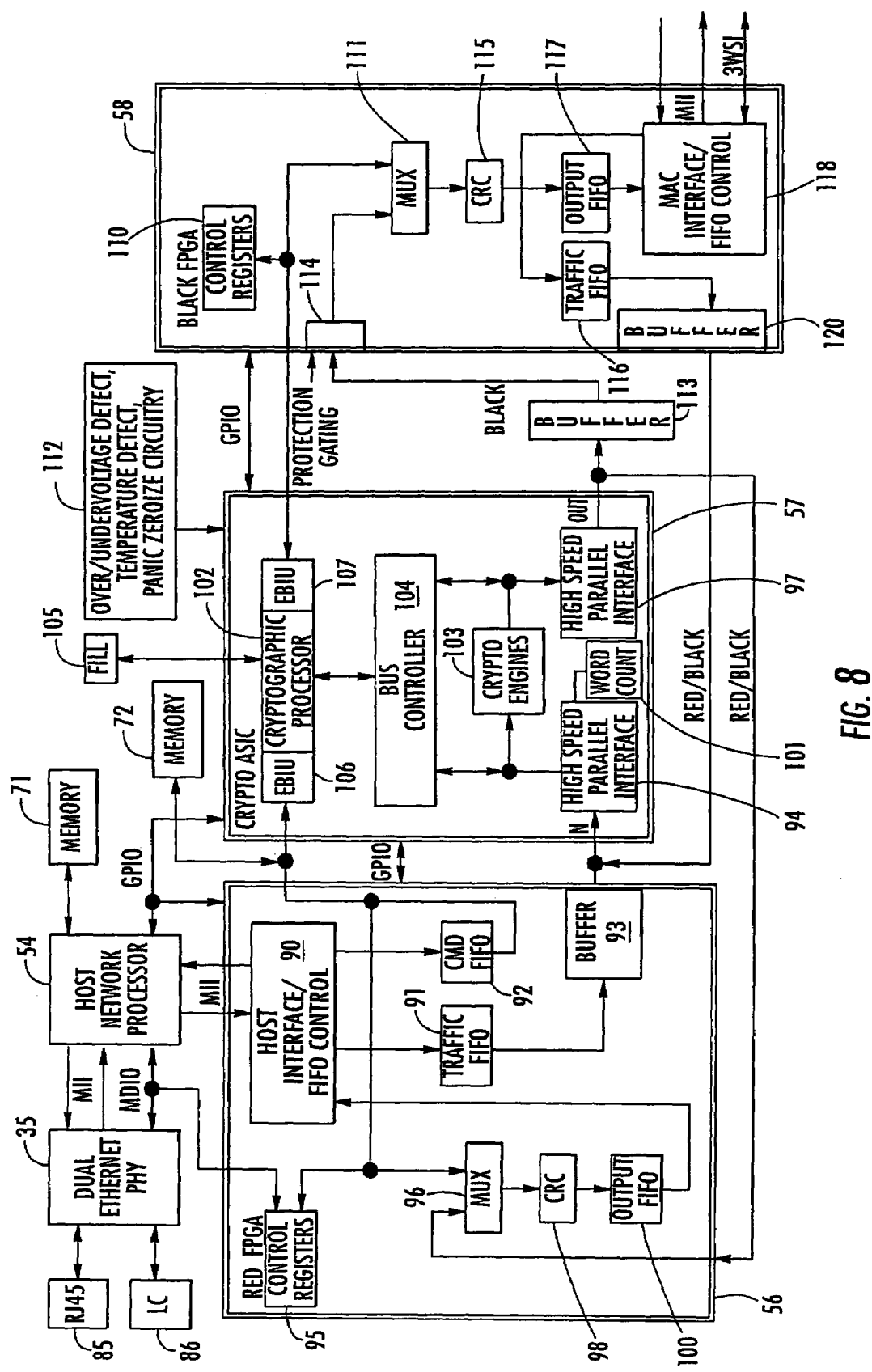

The cryptography circuitry 55 also illustratively includes a plurality of modules which may be implemented using hardware and/or software. Referring particularly to FIG. 8, the unencrypted data buffer (i.e., red FPGA) 56 illustratively includes a host interface/FIFO control module 90 for communicating with the host network processor 54 via the MII protocol, and traffic and command (CMD) FIFOs 91, 92 receiving outputs of the host interface/FIFO control module. It should be noted that various data paths in FIG. 8 are labeled as "red" and/or "black" to indicate whether they convey unencrypted or encrypted data, respectively, or both, to aid in understanding of the present invention.

The output of the traffic FIFO 91 is connected to a buffer 93, which is connected to a first high speed parallel interface 94 of the cryptographic circuit 57. The output of the command FIFO 92 is connected to a first external bus interface unit (EBIU) 106 of the cryptographic circuit 57. This EBIU 106 is also connected to control registers 95 and a multiplexer 96. Another input of the multiplexer 96 is connected to the output of a second high speed parallel interface 97 of the cryptographic circuit 57. The output of the multiplexer 96 is passed to a cyclic redundancy check module 98, the output of which is passed through an output FIFO 100 back to the host interface/FIFO control module 90.

The first high speed parallel interface 94 of the cryptography circuit 57 has a respective word counter 101 associated therewith. A cryptographic processing module 102 of the cryptography circuit 57 interfaces the first and second high speed parallel interfaces 94, 97 and one or more cryptographic engine modules 103 via a bus controller 104. The cryptographic processing module 102 also communicates with a fill circuit 105 for the loading of cryptographic keys. The EBIU 106 also interfaces the cryptographic processing module 102 with the memory 72. A second EBIU 107 interfaces the cryptographic processing module 102 with control registers 110 and a multiplexer 111 of the encrypted data buffer (i.e., black FPGA) 58. The signal path between the second EBIU 107 and the multiplexer 111 provides a command signal path.

Various components of the host network processor 54, red FPGA 56, cryptographic circuit 57, and black FPGA 58 also communicate via one or more general purpose input/output (GPIO) busses as shown, as will be appreciated by those skilled in the art. Additional circuitry 112 may also be coupled to the cryptography circuit 57 in certain embodiments for over/undervoltage detection, temperature detection, and/or panic zeroizing as required for a particular implementation, as will also be appreciated by those skilled in the art.

An output of the second high speed parallel interface 97 is passed via a buffer 113 to an input interface 114 which includes protection gating to prohibit red data from entering the black FPGA 58. The output of the input interface 114 is connected to a second input of the multiplexer 111 defining a traffic (i.e., data) path thereto. The output of the multiplexer 111 is provided to a cyclic redundancy check module 115, the output of which is provided to an output FIFO 117. An output of the MAC interface/FIFO control module 118 is provided to the input of the traffic FIFO 116. The output of the traffic FIFO 116 is passed via a buffer 120 back to the input of the first high speed parallel interface 94 of the cryptographic circuit 57, and the output of the output FIFO 117 is connected to the MAC interface/FIFO control module 118, which communicates with the communications module 32, as will be discussed further below.

Figure 5:
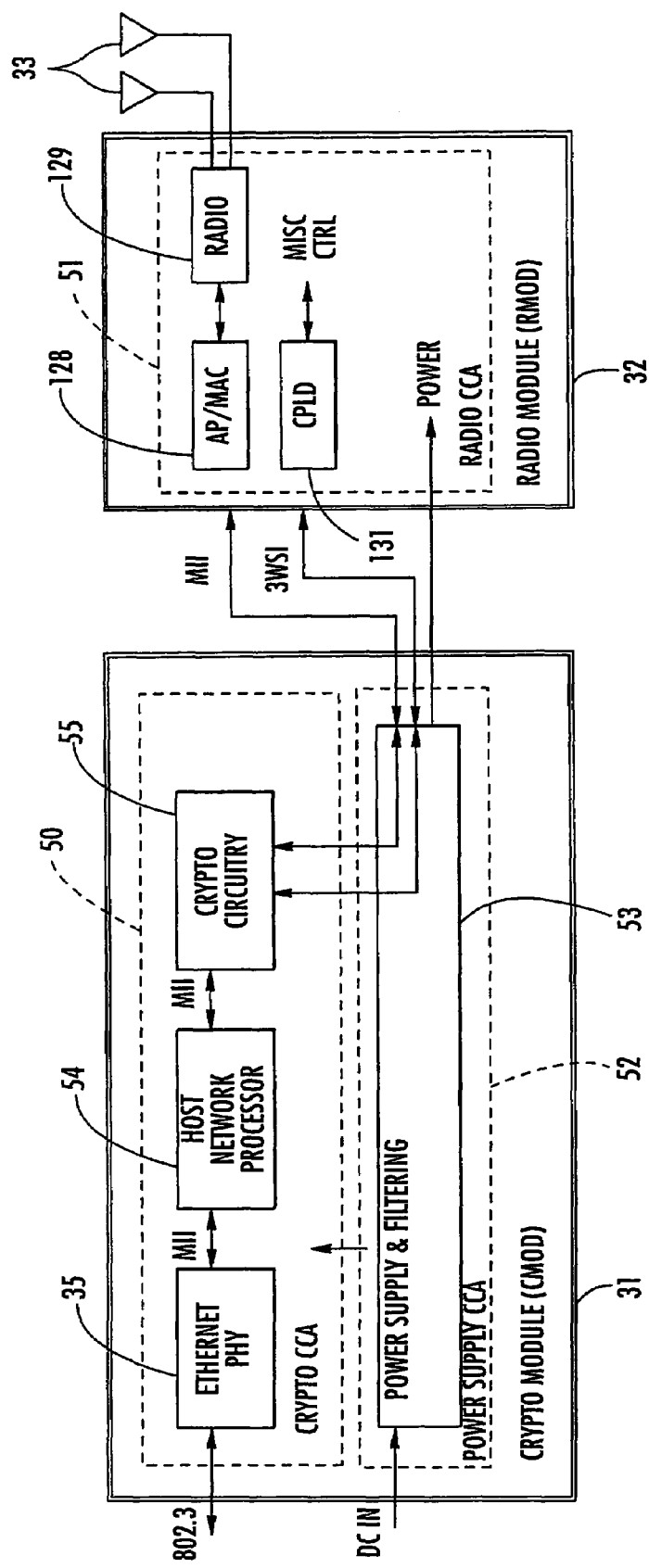

The various circuitry of the communication module 32 will now be described in further detail with particular reference to FIGS. 5 through 7. As noted above, the various circuitry of the communications module 32 is implemented in the communications CCA 51. In particular, the communications (or radio in the present WLAN example) CCA 51 illustratively includes a power interface 126 for cooperating with the communications power circuit 78 to supply the various communications circuitry components. Additional filter/ESD circuitry 127 may also be included in the signal path from the cryptographic module 31, if desired.

Figure 6:
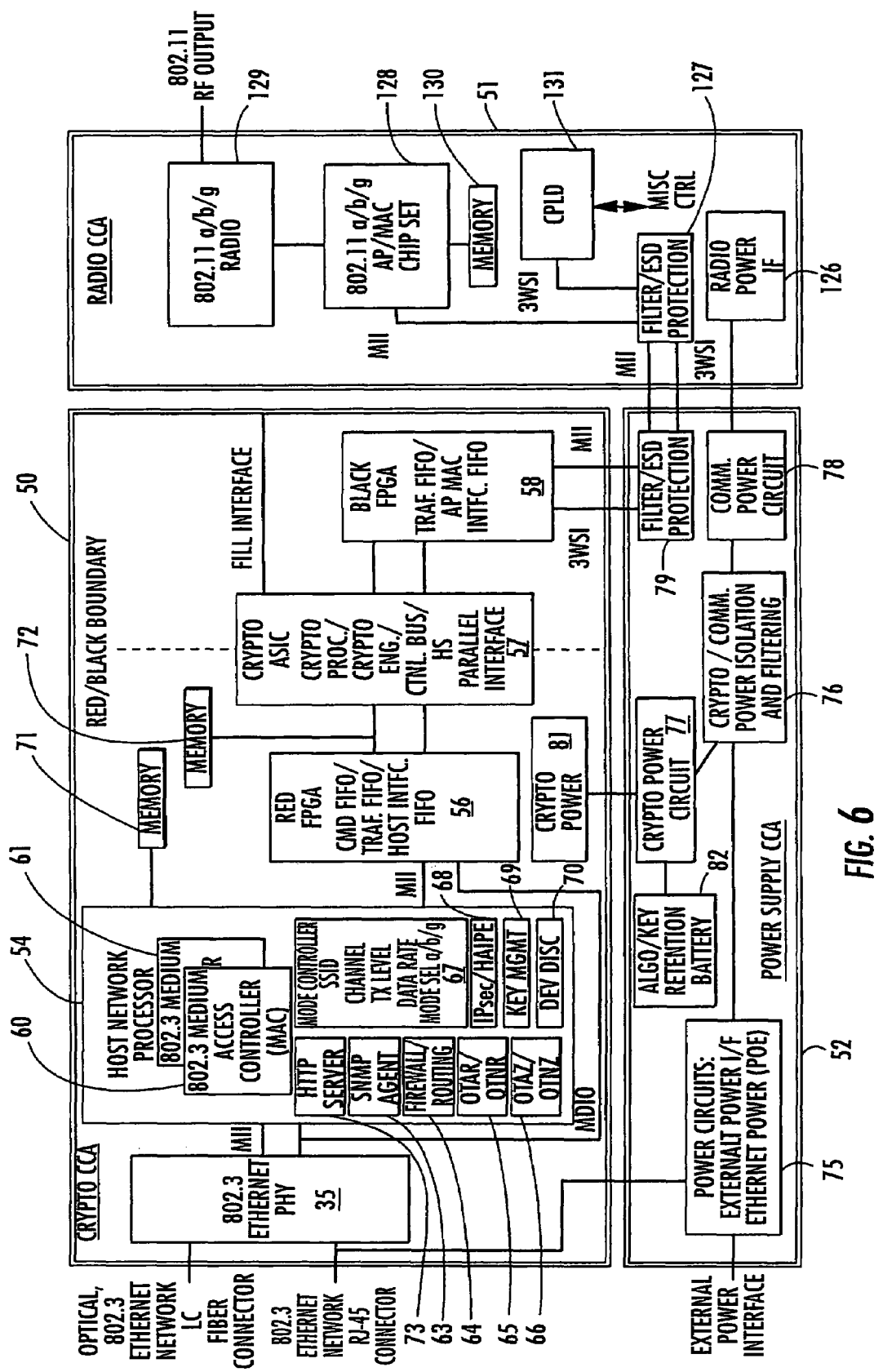
Figure 7:
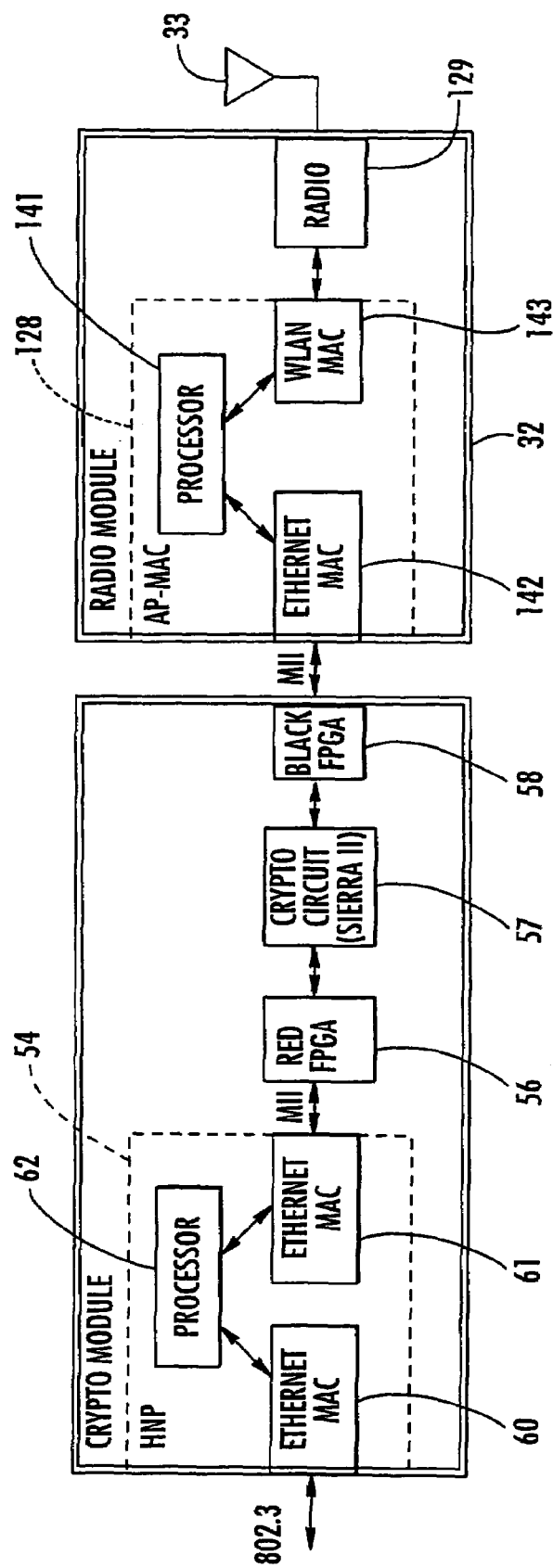

More particularly, the signal path between the cryptographic module 31 and communications module 32 includes a plurality of lines for MII communications, as well as a three-wire serial interface (3WSI), as seen in FIG. 6. Generally speaking, the MII lines are for transferring encrypted data between the cryptographic module 31 and the communications module 32, and the three wire serial interface is for status/configuration operations of the communications module, as will be discussed further below.

More particularly, the MII lines pass through the filter/ESD circuitry 127 to the network communications interface 47. In the present WLAN example, the network communications interface 47 includes an 802.11 a/b/g AP/MAC chip set 128 connected to the MII lines, and an associated 802.11 a/b/g radio 129 connected to the 802.11 a/b/g AP/MAC chip set for wirelessly communicating with a WLAN. One or more memories 130 may be provided for the 802.11 a/b/g AP/MAC chip set 128. The 802.11 a/b/g AP/MAC chip set 128 illustratively includes a processing module 141, an Ethernet MAC module 142 for communicating with the cryptographic module 31, and a WLAN MAC module 143 for performing the appropriate 802.11 WLAN interface and processing operations, as will be appreciated by those skilled in the art.

The communications CCA 51 also illustratively includes a logic device 131, such as a complex programmable logic device (CPLD), which is connected to the above-noted three wire serial interface. Generally speaking, the CPLD 131 cooperates with the cryptographic processor 36 to detect, status, and configure different types of communications modules 32. More particularly, the host network processor 54 polls the CPLD 131 to determine what type of communications module 32 is connected to the cryptographic module 31 (i.e., WLAN, wireline, fiber optic, etc.), as well as its operational status, as will be appreciated by those skilled in the art. The CPLD 131 also permits the host network processor 54 to configure the network communications interface 47 for operation in a given application, as will also be appreciated by those skilled in the art.

Figure 9:
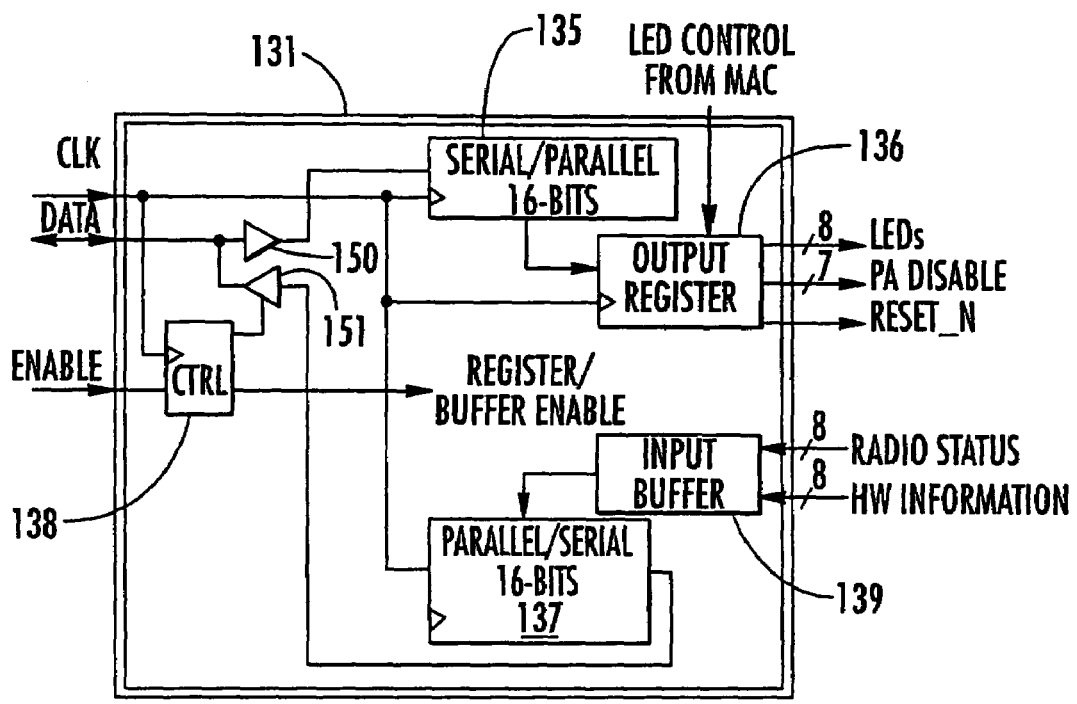
Figure 10:
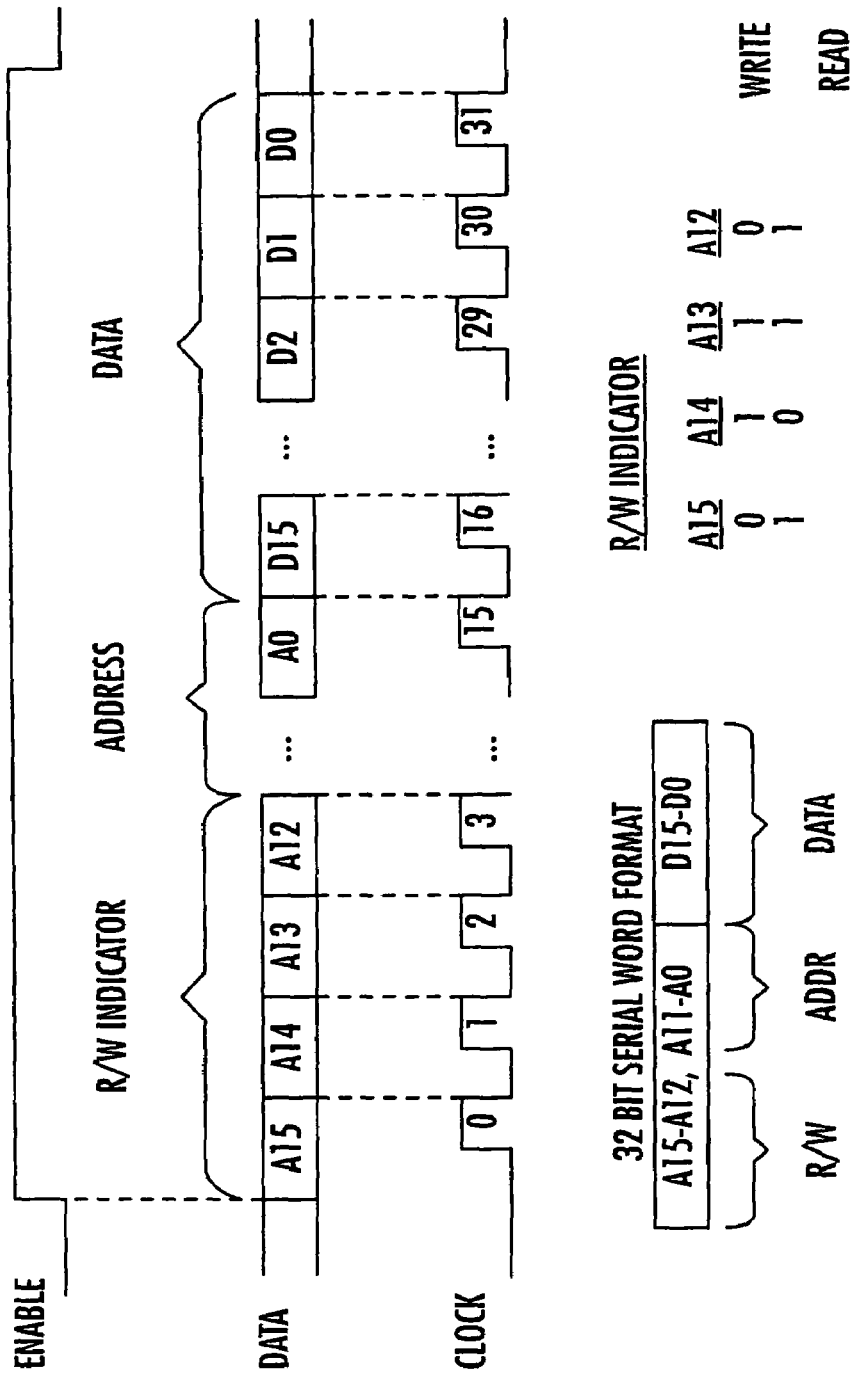
FIG. 10 is a timing diagram illustrating status and configuration operations for the communications module of the cryptographic device of FIG. 1.

Referring additionally to FIGS. 9 and 10, the three lines of the three wire serial interface respectively carry clock signals, data signals, and enable signals between the cryptographic and communications modules 31, 32. The clock signal is provided to a sixteen bit (although other sizes may also be used) serial to parallel data converter 135, an output register 136, a sixteen bit parallel to serial data converter 137, and control logic 138. More particularly, control data coming from the cryptographic processor 36 via the data line is written to the serial to parallel data converter 135 to be output by the output register 136.

More particularly, the communications module 32 may further include one or more status indicators 140 (e.g., light emitting diodes (LEDs)) carried by the second housing 45 for indicating operational mode, band, or other appropriate status information. The LEDs 140 receive multiple bits (e.g., eight) from the output register 136. Another set of bits (e.g., seven bits) from the register 136 are for enabling/disabling the communication module transmission circuitry (e.g., radio power amplifiers (PA)), and the remaining bits of the sixteen bit output is for providing a reset signal for the communications module 32.

The input buffer 139 receives multiple bits (e.g., eight) of status (e.g., radio status for a WLAN implementation) information and multiple bits (e.g., eight) of hardware information from the 802.11 chip set 128 (or other network communications interfaces in other embodiments) to pass along to the cryptographic processor 36 via the parallel to serial data converter 137 and the data line of the three wire serial bus. Read and write data buffers 150, 151 may also be connected to the data line, if desired. Furthermore, the control circuitry 138 also receives the enable signal and enables the output register 136 and input buffer 139.

A read or write operation occurs when the enable signal goes high, as seen in FIG. 10. The format of the command packets sent from the cryptographic processor 36 to the CPLD 131 are as follows. The first four address bits (A15-A12) of a packet instruct the CPLD 131 whether it is to receive data from the cryptographic processor 36, or whether it is to supply requested data thereto. The remaining address bits (A11-A0) provide the address for the appropriate component or operation being requested, while the data bits (D15-D0) are reserved for data. As such, thirty-two bit serial words are exchanged between the cryptographic processor 36 and CPLD 131.

An exemplary read/write addressing scheme is to use 0110 for the bits A15-A12 for a write operation, and 1011 for a read operation as shown, although other addressing schemes may also be used. Both the cryptographic module 31 and communications module 32 preferably clock data out on falling edges of the clock signal and clock data in on the leading edges, although other timing arrangements may be used in different embodiments.

Figure 11:
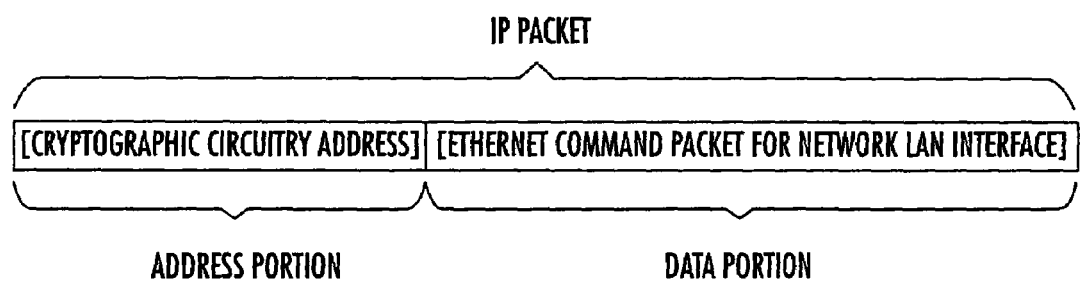
FIG. 11 is a block diagram of a cryptographic packet generated in accordance with the present invention.

A particularly advantageous approach for transferring the command packets from the cryptographic processor 36 to the communications module 32 will now be described. The host network processor 54 generates cryptographic processor command packets for the cryptographic processor 36. These packets each include an Ethernet address portion for addressing the cryptography circuit 57 and an IP packet that encapsulates a cryptographic command. In accordance with the present invention, the host network processor 54 encapsulates a command packet to be operated upon by the communications module 32 within the cryptographic command, as shown in FIG. 11. By using the second EBIU 107, for example, the communications module command packets may be passed to the communications module 32 without processing (i.e., encrypting). This provides a convenient way to transcend the red/black data boundary (FIG. 6) without potentially compromising security.

More particularly, the format of a cryptographic processor command packet is as follows. The Ethernet address portion of the packet is addressed to the cryptography circuit 57. More particularly, the address portion may include Ethernet header addresses, an IP header, and cryptographic command information, as will be appreciated by those skilled in the art. The communications module command packet destined for the communications module is encapsulated in the data portion of the IP packet. Accordingly, when the cryptography circuit 57 receives such a cryptographic processor command packet, it will recognize the packet as a cryptographic command. As such, the cryptography circuit 57 will strip its own address information from the packet and transfer the remaining portion (i.e., the encapsulated communications module command packet) to the communications module 32. Preferably, the host network processor 54 formats the data portions of the IP packets (and, thus, the command packets for the communications module 32) based upon the simple network management protocol (SNMP), although other protocols may also be used.

The above-described approach may be used for sending communications module command data via the MII lines or the BWSI, and this approach may be used in reverse to communicate information back to the host network processor 54, as will be appreciated by those skilled in the art. Since typical prior art cryptographic devices include all of the cryptography and communications circuitry within the same housing, the formatting of status/configuration commands for the communications circuitry is typically not an issue. However, as will be appreciated by those of skill in the art, the above-described approach provides a convenient and secure way to perform such command/control operations despite the separation between the cryptographic and communications modules 31, 32. Of course, it will be appreciated that other approaches for formatting and/or encapsulating such command packets may also be used, as will be appreciated by those skilled in the art.

The above-described interchangeability of the communications modules 32 and the ability to pass the command packets through the red/black boundary is facilitated by using a same, predetermined interface protocol, i.e., an MII protocol, along the entire signal path between the user network interface 35 and the network communications interface 47. That is, the cryptographic processor 36 not only communicates with the user network interface 35 using an MII-based protocol, it also communicates with the network communications interface 47 using the same MII-based protocol. The MII protocol may be based upon the original MII standard set forth in the IEEE 802.3 standard, or it may be a variant thereof such as reduced MII (RMMI) or gigabit MII (GMII), for example, although other protocols may be used as well.

Maintaining the consistent use of the MII protocol through the chain of circuitry from the user network interface 35 to the network communications interface 47 allows the cryptographic module 31 and the communications module 32 both to operate using a unique external MAC addresses, while at the same time using fixed internal MAC addresses. More particularly, the Ethernet MAC modules 60 and 143 operate using a unique external MAC addresses for each individual cryptographic module 31 and communications module respectively, while the Ethernet MAC modules 61 and 142 use fixed MAC addresses which are the same for every cryptographic device 30.

Thus, the cryptographic circuitry 55 essentially becomes transparent to the communications module 32, as it appears to the communications module that it is connected directly to the Ethernet MAC module 61. Moreover, the "hard-coded" MAC addresses used by the Ethernet MAC's in both modules 61 and 142 provide for the transfer of command packets as described above, as well as a controlled transmission of encrypted data packets, as will be appreciated by those skilled in the art.

Another particularly advantageous feature of the invention is that different communications modules 32 may not only be used to allow a single cryptographic module 31 to be used with multiple media types (e.g., wireless, wireline, fiber optic, etc.), but the communications modules may also be used to provide multi-mode operation for a given media, such as in the case of a WLAN. More particularly, a WLAN communications module 32 may advantageously use an 802.11 a/b/g chip set 128 that is switchable between wireless LAN modes (i.e., access point (AP) mode, infrastructure mode, and ad-hoc mode) by the cryptographic module 31 using the above-described command packets, for example.

Thus, a same WLAN communications module 32 in accordance with the present invention may advantageously be used with any advice in a WLAN to provide desired functionality, such as individual station operation, bridging to a wired network, peer-to-peer communications, etc., as will be appreciated by those skilled in the art. Moreover, mode changes can be accomplished "on the fly" as desired using command packets. It will therefore be appreciated that with such a WLAN communications module 32, the cryptographic device 30 provides complete 802.11 functionality in a single unit while also providing a wireless bridge that can be used to access a secure network. The cryptographic module 30 may advantageously be configured to allow selection and configuration of 802.11 modules of operation via a standard Web browser, for example.

Alternately, switching between WLAN operational modules may also be accomplished by using different types of 802.11 chip sets 128 for respective WLAN operational modes in different WLAN communications modules. That is, a different WLAN communications module 32 would be used depending upon whether an AP, infrastructure, or ad-hoc mode was desired for a given LAN device 40.

Figure 13:
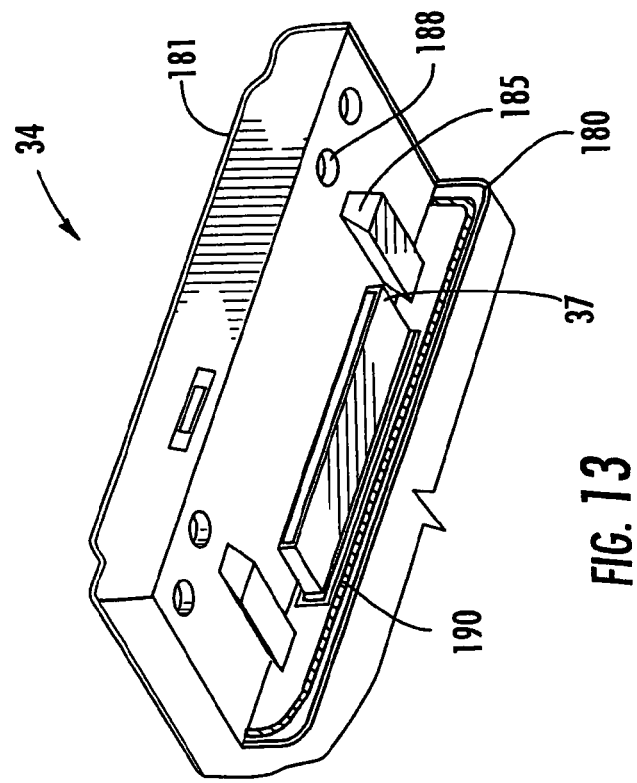
FIGS. 12 and 13 are perspective views illustrating the connector configurations of the communications module and cryptographic module, respectively, of the cryptographic device of FIG. 1.
Figure 12:
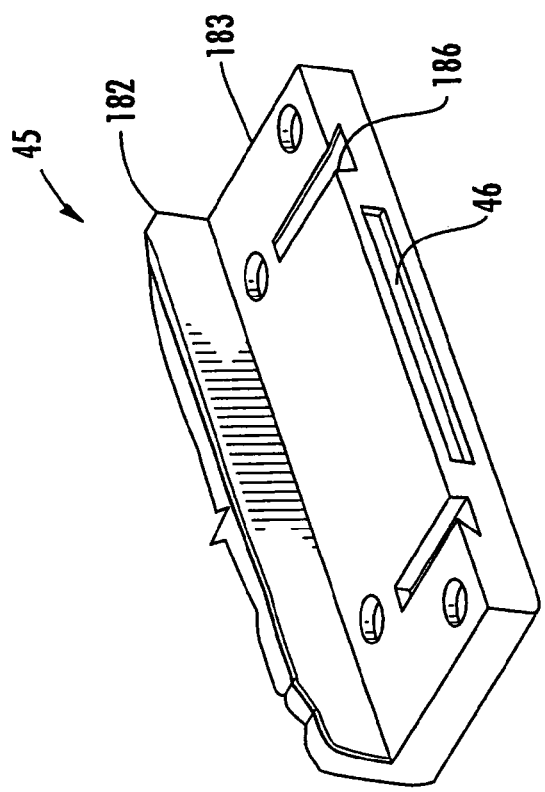
Figure 14:
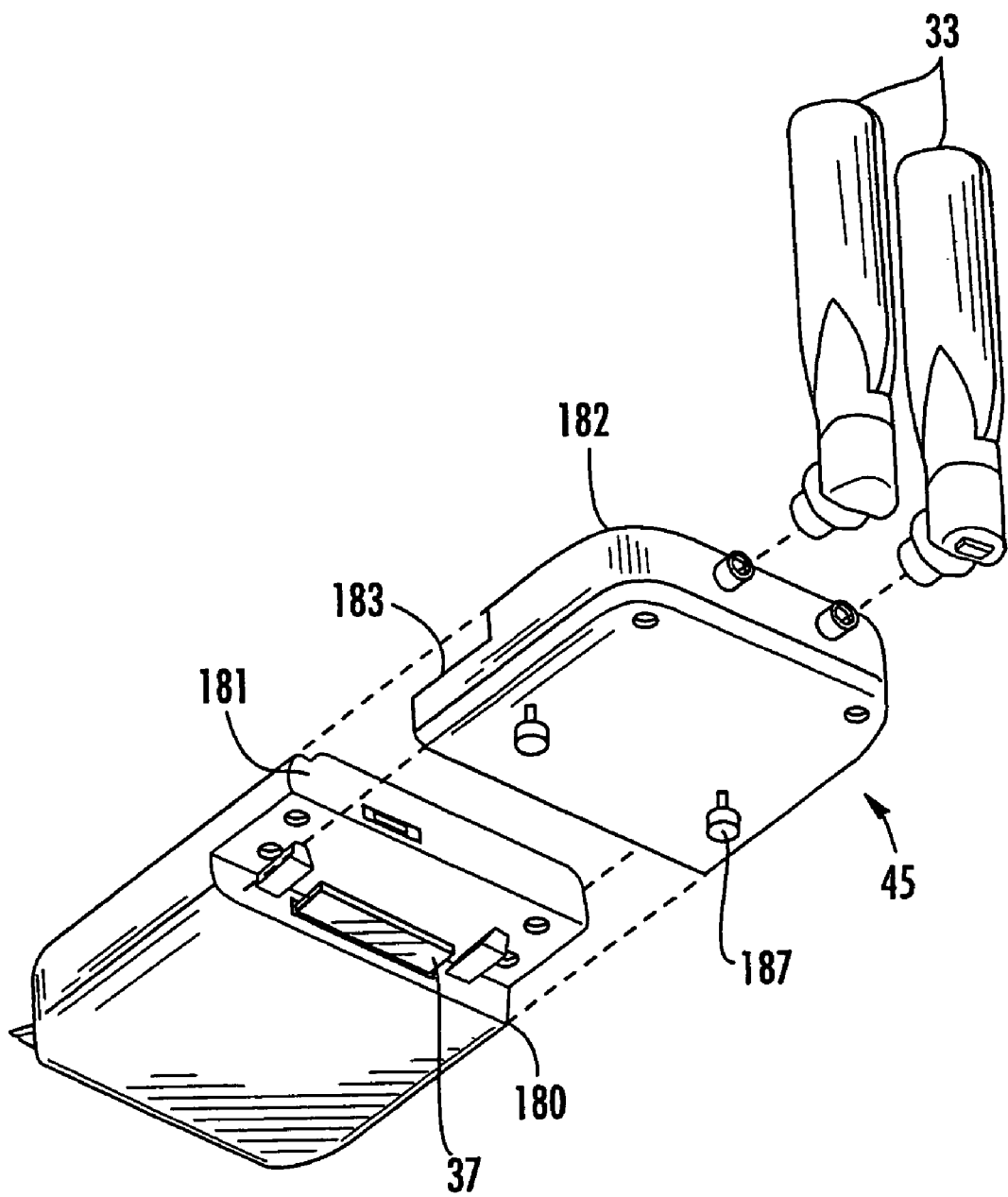
FIG. 14 is another exploded perspective view showing the bottom of the cryptographic device of FIG. 1 and further illustrating coupling of the various modules thereof.

Turning to FIGS. 12-14, the coupling structure of the cryptographic and communications modules 31, 32 will now be further described. More particularly, the first housing 34 of the cryptographic module 31 may include a first body 180 and a first extension 181 extending outwardly therefrom, and the second housing 45 may include a second body 182 and a second extension 183 extending outwardly therefrom. As such, the first and second extensions 181, 183 may be aligned in overlapping relation when the first and second connectors 37, 46 are removably mated together.

The first connecter 37 is illustratively carried by the first body 180 adjacent the first extension 181, and the second connector 46 is carried by the second extension 186. Although other arrangements may be used in accordance with the present invention, this arrangement is particularly advantageous-in that it allows the cryptographic CCA 50, which has more circuitry than the power supply CCA 52, to be positioned to take advantage of the extra length (and, therefore, surface area) of the first extension 181. Similarly, the communications CCA 51 is positioned to take advantage of the additional length of the second extension 183.

Each of the first and second extensions 181, 183 may also have surface features on opposing surfaces thereof to slidably engage and guide the cryptographic and communications modules 31, 32 together in mating relation. By way of example, the surface features may include rails 185 and corresponding channels 186 which define one or more slidable interlocking (e.g., dovetail) joints therebetween (two are shown in the exemplary implementation). One or more fasteners, such as captive screws 187 which mate with corresponding threaded holes 188, are also preferably included for removably fastening the cryptographic and communications modules 31, 32 together.

As shown in the illustrated example, the first and second connectors 37, 46 are multi-pin electrical connectors, although various electrical connector styles known to those skilled in the art may be used. Also, one or more seals 190 may be positioned between the cryptographic module 31 and the communications module 32. It will therefore be appreciated that the above-described electrical/mechanical structure provides a robust yet simple interconnection that is capable of providing desired EMI shielding and environmental sealing. Various materials (e.g., metal, plastic, etc.) may be used for the first and second housings 37, 45, as will also be appreciated by those skilled in the art.

Based upon the foregoing description, numerous advantages of the present invention will be apparent to those skilled in the art. For example, the cryptographic device 30 is interoperable with standard commercial 802.11 and 802.3 networking equipment. More particularly, it may be used with any computing platform with an Ethernet interface (e.g., LINUX/UNIX, VxWorks, Windows, Macintosh, etc.). As such, independent developers may advantageously be able to develop applications without the need to write special drivers to communicate with the user network interface 35. Likewise, independent developers may advantageously be able to develop communications modules 32 for various and/or specialized communications applications since they will interface with the cryptographic module 31 via a well-defined, controlled electrical/mechanical interface. Furthermore, the coupling structure not only provides for easy interchangeability of different communications modules 32 with a single cryptographic module 31, the rugged housing and connector design allows for operation over a wide range of climates and conditions.

Figure 15:
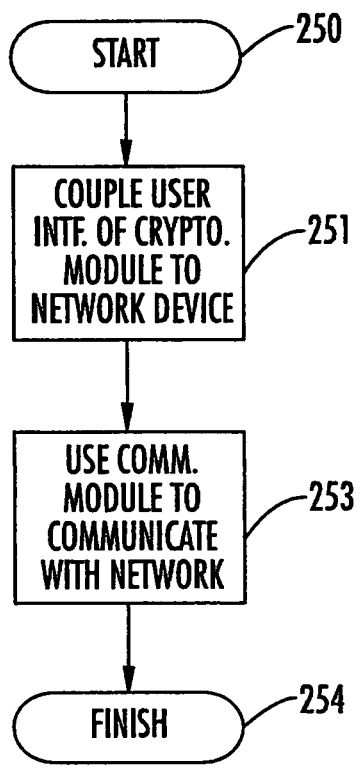
FIGS. 15 through 20 are flow diagrams illustrating various communications method aspects in accordance with the present invention.

Turning additionally to FIG. 15, a first communications method aspect of the invention will now be described. Beginning at Block 250, the user network interface 35 of the cryptographic module 31 is coupled to a LAN device 40, at Block 251. Further, the communications module 32, once attached to the cryptographic module 31, may then be used to communicate with various networks (i.e., LAN) 48, thus concluding the illustrated method, at Block 254.

Figure 16:
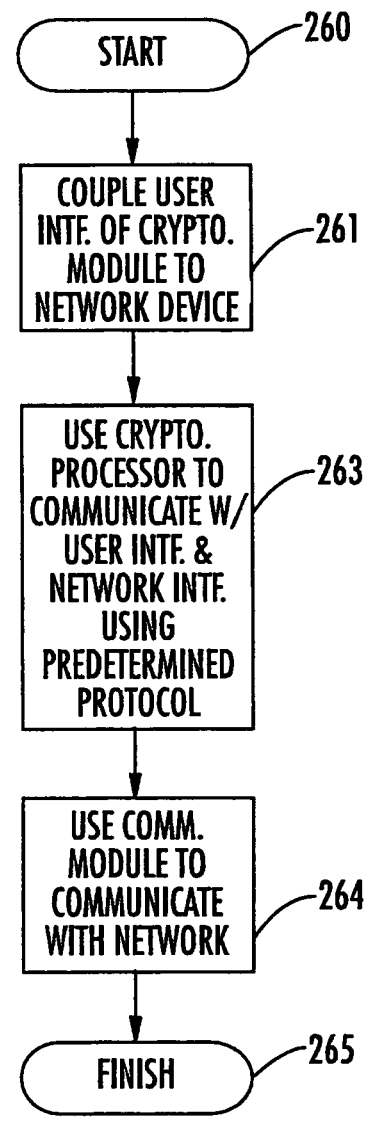

Referring to FIG. 16, another communications method aspect of the invention begins (Block 260) with coupling the cryptographic module 31 to the network device 40, at Block 261, with the communications module 32 being coupled to the cryptographic module as described above. The method further includes using the cryptographic processor 36 to communicate with the user network interface 35 and the network communications interface 47 using a same predetermined protocol (e.g., MII), at Block 263, as discussed above, and also communicating with the network (i.e., LAN) 48, at Block 264, thus concluding the illustrated method (Block 265).

Figure 17:
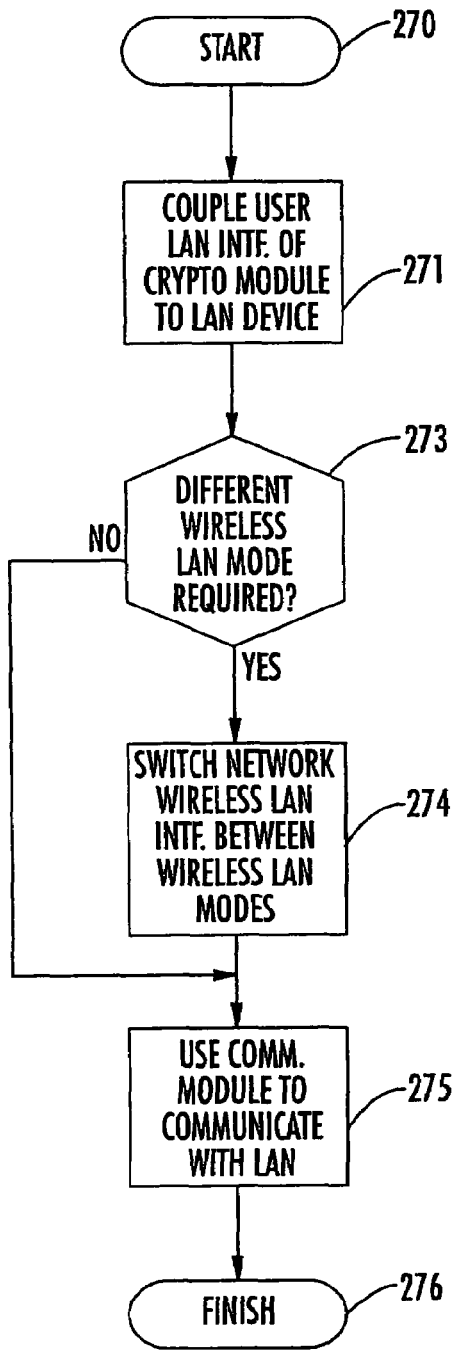
Figure 18:
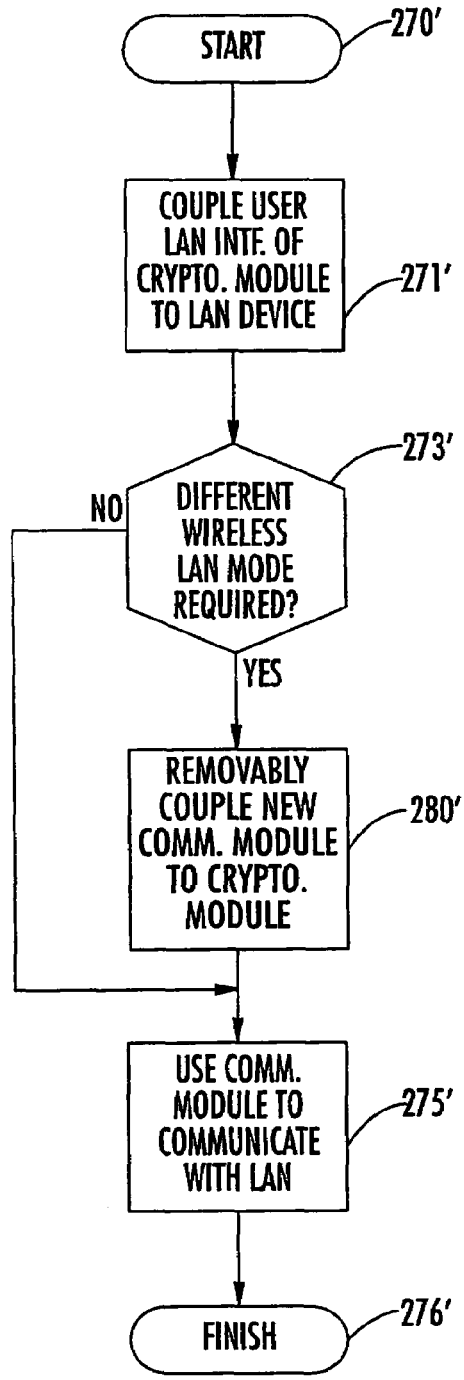

Two additional method aspects for WLAN operation are now described with reference to FIGS. 17 and 18. Beginning at Block 270, the cryptographic module 31 is coupled to the network device 40, at Block 271, with the communications module 32 being removably coupled to the cryptographic module 31, as described above. If during the course of operation it is determined that a different WLAN mode of operation is required, at Block 273, if a multi-mode network wireless network interface 274 is included in the WLAN communications module 32, as discussed above, the interface may be switched to the desired wireless LAN mode, at Block 274. Thereafter, or if a new WLAN mode is not required, wireless communications with the network (i.e., LAN) 48 may be conducted, at Block 275, thus concluding the illustrated method (Block 276). If different 802.11 modes are implemented in respective WLAN communications modules 32, as discussed above, the step illustrated at Block 274 may be replaced with the step of removably coupling a new communications module providing the desired WLAN operational mode to the cryptographic module 31, at Block 280'.

Figure 19:
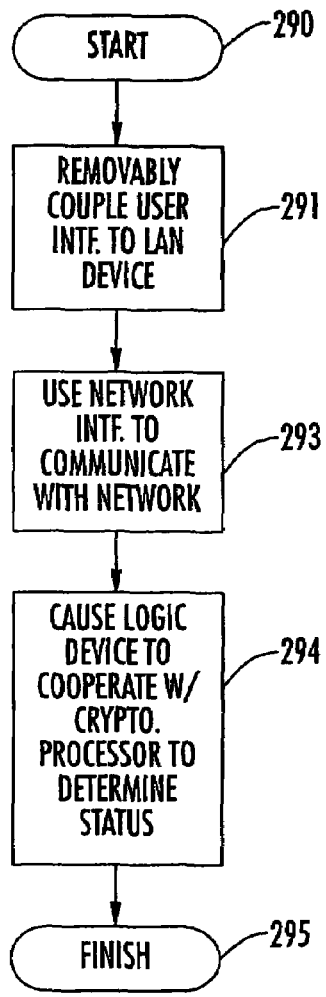

Still another communications method aspect of the invention is now described with reference to FIG. 19. The method beings (Block 290) with coupling the cryptographic module 31 to the network device 40, at Block 291, with the communications module 32 being removably coupled to the cryptographic module, and using the communications module to communicate with the network (i.e., LAN) 48, at Block 293, as described above. The method also includes using the logic CPLD 131 in cooperation with the cryptographic processor 36 to determine a status of the communications module 32, at Block 294, thus concluding the illustrated method, at Block 295. Of course, it will be appreciated that status may be obtained (and/or configuration performed) prior to commencing communications with the network (i.e., LAN) 48, and that repeated status updates may continue to be obtained through the communications process.

Figure 20:
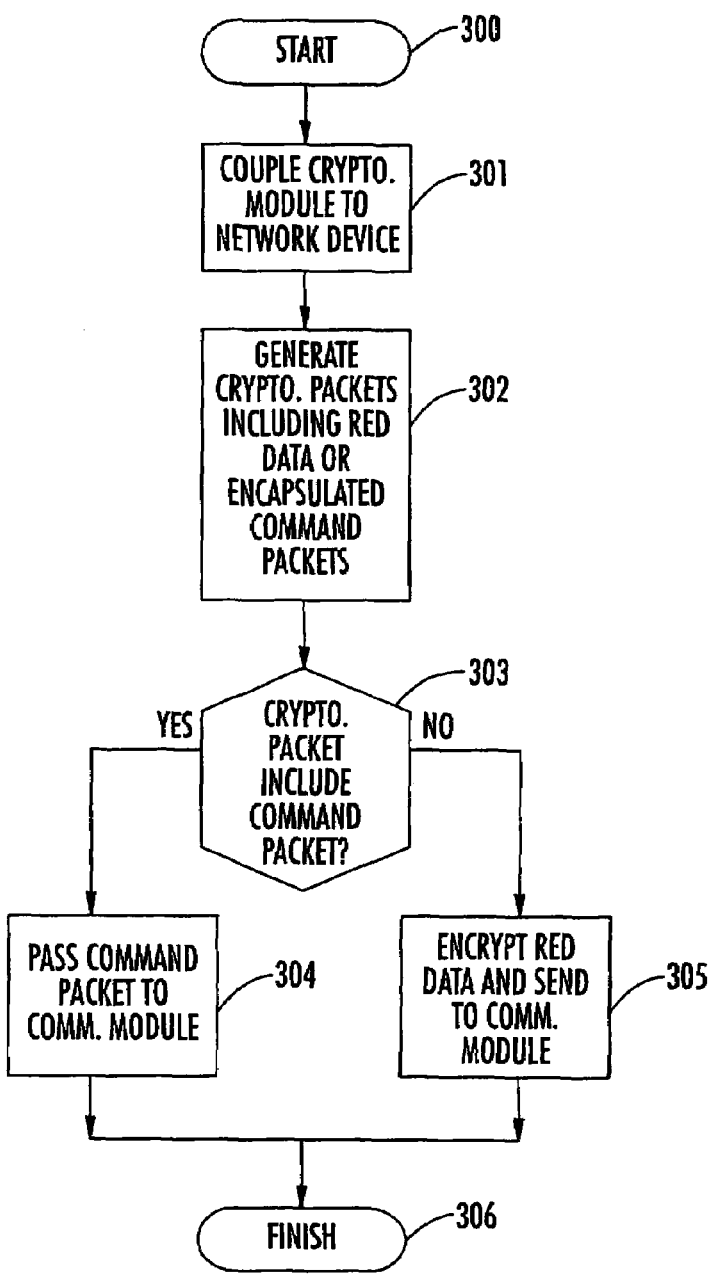

Another communications method aspect of the invention will now be described with reference to FIG. 20. The method begins (Block 300) with coupling the cryptographic module 31 to the network device 40, as described above, at Block 301, with a communications module 32 being removably coupled to the cryptographic module. The method may further include causing the host network processor 54 to generate cryptographic packets for the cryptographic circuit 57 each including an address portion and a data portion, and to encapsulate command packets for the network communications interface 47 in the data portions of the cryptographic packets, at Block 302, as previously described above. Thus, if the cryptographic circuit 57 determines that a command packet is encapsulated in the cryptographic packet, the cryptographic circuit passes the command packet to the communications module 32 without performing cryptographic processing thereon, at Block 304, as also discussed above. Otherwise, cryptographic processing is performed on the data in the cryptographic packet, at Block 305, thus concluding the illustrated method (Block 306).

Many modifications and other embodiments of the invention will come to the mind of one skilled in the art having the That which is claimed is:

1. A cryptographic device comprising:
a cryptographic module and a communications module coupled thereto;
said cryptographic module comprising a user network interface, a host network processor coupled to said user network interface, and a cryptographic processor coupled to said host network processor;
said communications module comprising a network communications interface coupled to said cryptographic processor;
said host network processor generating cryptographic processor command packets for said cryptographic processor, each comprising an address portion for addressing the cryptographic processor and a data portion;
each data portion including one of unencrypted data and command packets for said communications module;
said host network processor also encapsulating the command packets for said communications module in the data portions of said cryptographic processor command packets;
said cryptographic processor determining if a given cryptographic processor command packet includes the encapsulated command packet and based thereon stripping the address portion from the cryptographic processor command packet and passing the encapsulated communications module command packet to said communications module without performing cryptographic processing thereon;
said cryptographic processor determining if another give cryptographic processor command packet includes the unencrypted data packet and encrypting the unencrypted data packet and passing the encrypted data packet to said communications module.

2. The cryptographic device of claim 1 wherein said host network processor formats the data portions based upon the simple network management protocol (SNMP).

3. The cryptographic device of claim 1 wherein the communications module command packets comprise Ethernet packets.

4. The cryptographic device of claim 1 wherein the cryptographic processor command packets comprise Internet protocol (IP) packets.

5. The cryptographic device of claim 1 wherein said cryptographic module further comprises:
a first housing carrying said user network interface, said host network processor, and said cryptographic processor; and
a first connector carried by said first housing and coupled to said cryptographic processor.

6. The cryptographic device of claim 5 wherein said communications module further comprises:
a second housing carrying said network communications interface; and
a second connector carried by said second housing and being removably mateable with said first connector of said cryptographic module.

7. The cryptographic device of claim 1 wherein said cryptographic processor comprises:
an unencrypted data buffer circuit coupled to said host network processor;
a cryptography circuit coupled to said unencrypted data buffer circuit; and
an encrypted data buffer circuit coupled to said cryptography circuit.

8. The cryptographic device of claim 1 wherein said communications module comprises a predetermined one from among a plurality of interchangeable communications modules each for communicating over a different communications media.

9. The cryptographic device of claim 1 wherein said network communications interface comprises at least one of a wireless LAN (WLAN) communication circuit, a wireline communication circuit, and a fiber optic communication circuit.

10. The cryptographic device of claim 1 wherein said user network interface comprises an Ethernet Local Area Network (LAN) interface, and wherein said network communications interface comprises a network LAN interface.

11. The cryptographic device of claim 5 wherein said cryptographic module further comprises a tamper circuit for disabling said cryptographic processor based upon tampering with said first housing.

12. A cryptographic device comprising:
a cryptographic module and a communications module coupled thereto;
said cryptographic module comprising a user Local Area Network (LAN) interface, a host network processor coupled to said user LAN interface, and a cryptographic processor coupled to said host network processor;
said communications module comprising a network LAN interface coupled to said cryptographic processor;
said host network processor generating cryptographic processor command packets for said cryptographic processor, each comprising an address portion for addressing the cryptographic processor and a data portion;
each data portion including one of unencrypted data and Ethernet command packets for said communications module;
said host network processor also encapsulating the Ethernet command packets for said communications module in the data portions of said cryptographic processor command packets, said host network processor formatting the data portions based upon the simple network management protocol (SNMP);
said cryptographic processor determining if a given cryptographic processor command packet includes the encapsulated Ethernet command packet and based thereon stripping the address portion from the cryptographic processor command packet and passing the encapsulated communications module Ethernet command packet to said communications module without performing cryptographic processing thereon;
said cryptographic processor determining if another given cryptographic processor command packet includes the unencrypted data packet and encrypting the unencrypted data packet and passing the encrypted data packet to said communications module.

13. The cryptographic device of claim 12 wherein the cryptographic processor command packets comprise Internet protocol (IT) packets.

14. The cryptographic device of claim 12 wherein said cryptographic module further comprises:
a first housing carrying said user LAN interface, said host network processor, and said cryptographic processor; and
a first connector carried by said first housing and coupled to said cryptographic processor.

15. The cryptographic device of claim 14 wherein said communications module further comprises:
- a second housing carrying said network LAN interface; and
- a second connector carried by said second housing and being removably mateable with said first connector of said cryptographic module.

16. The cryptographic device of claim 12 wherein said cryptographic processor comprises:
- an unencrypted data buffer circuit coupled to said host network processor;
- a cryptography circuit coupled to said unencrypted data buffer circuit; and
- an encrypted data buffer circuit coupled to said cryptography circuit.

17. The cryptographic device of claim 12 wherein said communications module comprises a predetermined one from among a plurality of interchangeable communications modules each for communicating over a different communications media.

18. The cryptographic device of claim 12 wherein said network LAN interface comprises at least one of a wireless LAN (WLAN) communication circuit, a wireline LAN communication circuit, and a fiber optic LAN communication circuit.

19. The cryptographic device of claim 12 wherein said user LAN interface comprises an Ethernet interface.

20. The cryptographic device of claim 12 wherein said cryptographic module further comprises a tamper circuit for disabling said cryptographic processor based upon tampering with said first housing.

21. A communications method comprising:
- coupling a cryptographic module to a network device, the cryptographic module comprising a user network interface, a host network processor coupled to the user network interface, and a cryptographic processor coupled to the host network processor;
- providing a communications module comprising a network communications interface coupled to the cryptographic processor;
- causing the host network processor to generate cryptographic processor command packets for the cryptographic processor each comprising an address portion for addressing the cryptographic processor and a data portion;
- each data portion including one of unencrypted data and command packets for the communication module;
- the host network processor also encapsulating the command packets for the communications module in the data portions of the cryptographic processor command packets;
- causing the cryptographic processor to determine if a given cryptographic processor command packet includes the encapsulated command packet and based thereon strip the address portion from each cryptographic processor command packet and pass the encapsulated communications module command packet to the communications module without performing cryptographic processing thereon; and
- causing the cryptographic processor to determine if another given cryptographic processor command packet includes the unencrypted data packet and encrypts the unencrypted data packet and passes the encrypted data packet to the communications module.

22. The method of claim 21 further comprising causing the host network processor to format the data portions based upon the simple network management protocol (SNMP).

23. The method of claim 21 wherein the communications module command packets comprise Ethernet packets.

24. The method of claim 21 wherein the cryptographic processor command packets comprise Internet protocol (IP) packets.

25. The method of claim 21 wherein the user network interface comprises an Ethernet Local Area Network (LAN) interface, and wherein the network communications interface comprises a network LAN interface.

26. A communications system comprising:
- a plurality of network devices coupled together to define a network, and a cryptographic device coupled to at least one of said network devices;
- said cryptographic device comprising a cryptographic module coupled to said at least one network device, and a communications module coupled to said cryptographic module;
- said cryptographic module comprising a user network interface, a host network processor coupled to said user network interface, and a cryptographic processor coupled to said host network processor;
- said communications module comprising a network communications interface coupled to said cryptographic processor;
- said host network processor generating cryptographic processor command packets for said cryptographic processor each comprising an address portion for addressing the cryptographic processor and a data portion;
- each data portion including one of unencrypted data and command packets for said communications module;
- said host network processor also encapsulating the command packets for said communications module in the data portions of said cryptographic processor command packets;
- said cryptographic processor determining if a given cryptographic processor command packet includes the encapsulated command packet and based thereon stripping the address portion from the cryptographic processor command packet and passing the encapsulated communications module command packet to said communications module without performing cryptographic processing thereon,
- said cryptographic processor determining if another given cryptographic processor command packet includes the unencrypted data packet and encrypting the unencrypted data packet and passing the encrypted data packet to said communications module.

27. The system of claim 26 wherein said host network processor formats the data portions based upon the simple network management protocol (SNMP).

28. The system of claim 26 wherein the communications module command packets comprise Ethernet packets, and wherein the cryptographic processor command packets comprise Internet protocol (IP) packets.

29. The system of claim 26 wherein said cryptographic module further comprises:
- a first housing carrying said user network interface, said host network processor, and said cryptographic processor; and
- a first connector carried by said first housing and coupled to said cryptographic processor.

30. The system of claim 29 wherein said communications module further comprises:
- a second housing carrying said network communications interface; and a second connector carried by said second housing and being removably mateable with said first connector of said cryptographic module.

31. The system of claim 26 wherein said cryptographic processor comprises:
   an unencrypted data buffer circuit coupled to said host network processor;
   a cryptography circuit coupled to said unencrypted data buffer circuit; and
   an encrypted data buffer circuit coupled to said cryptography circuit.

32. The system of claim 26 wherein said communications module comprises a predetermined one from among a plurality of interchangeable communications modules each for communicating over a different communications media.

33. The system of claim 26 wherein said network communications interface comprises at least one of a wireless LAN (WLAN) communication circuit, a wireline communication circuit, and a fiber optic communication circuit.

34. The system of claim 26 wherein said user network interface comprises an Ethernet Local Area Network (LAN) interface, and wherein said network communications interface comprises a network LAN interface.

35. The system of claim 26 wherein said cryptographic module further comprises a tamper circuit for disabling said cryptographic processor based upon tampering with said first housing.

36. A cryptographic module comprising:
   a user network interface;
   a host network processor coupled to said user network interface; and
   a cryptographic processor coupled to said host network processor;
   said host network processor generating cryptographic processor command packets for said cryptographic processor each comprising an address portion for addressing the cryptographic processor and a data portion;
   each data portion including one of unencrypted data and command packets for said communications module;
   said host network processor also encapsulating the command packets for a network communications module in the data portions of said cryptographic processor command packets;
   said cryptographic processor determining if a given cryptographic processor command packet includes the encapsulated command packet and based thereon stripping the address portion from the cryptographic processor command packet and passing the encapsulated communications module command packet to the network communications module without performing cryptographic processing thereon;
   said cryptographic processor determining if another given cryptographic processor command packet includes the unencrypted data packet and encrypting the unencrypted data packet and passing the encrypted data packet to said communications module.

37. The cryptographic module of claim 36 wherein said host network processor formats the data portions based upon the simple network management protocol (SNMP).

38. The cryptographic module of claim 36 wherein the communications module command packets comprise Ethernet packets.

39. The cryptographic module of claim 36 wherein the cryptographic processor command packets comprise Internet protocol (IP) packets.

40. The cryptographic module of claim 36 wherein said cryptographic processor comprises:
   an unencrypted data buffer circuit coupled to said host network processor;
   a cryptography circuit coupled to said unencrypted data buffer circuit; and
   an encrypted data buffer circuit coupled to said cryptography circuit.

41. The cryptographic module of claim 36 wherein said user network interface comprises an Ethernet Local Area Network (LAN) interface.

* * * * *